(12) United States Patent
Ikami (10) Patent No.: US 6,236,058 B1
(45) Date of Patent: May 22, 2001

(54) IMAGE RECORDING AND READING SYSTEM

(75) Inventor: Seishi Ikami, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/268,356

(22) Filed: Mar. 16, 1999

(30) Foreign Application Priority Data

Mar. 17, 1998 (JP) .................................................. 10-066980

(51) Int. Cl.$^7$ ............................ G03B 42/00; G01N 23/04
(52) U.S. Cl. ............................ 250/586; 250/585; 250/583
(58) Field of Search ...................... 250/586, 583, 250/585

(56) References Cited

U.S. PATENT DOCUMENTS

| | | | |
|---|---|---|---|
| 4,926,045 | * 5/1990 | Hosoi et al. | 250/585 |
| 5,028,793 | 7/1991 | Lindmayer et al. | 250/484.1 |
| 5,038,037 | * 8/1991 | Saotome | 250/583 |
| 5,352,903 | * 10/1994 | Kohda et al. | 250/586 |
| 5,654,556 | * 8/1997 | Yasuda | 250/584 |
| 5,900,640 | * 5/1999 | Ogura | 250/585 |
| 5,923,043 | * 7/1999 | Struye et al. | 250/585 |

FOREIGN PATENT DOCUMENTS

| | | | |
|---|---|---|---|
| 2 246 197 | 1/1992 | (GB) | G01N/21/76 |
| 55-12429 | 1/1980 | (JP) | G01T/1/10 |
| 55-116340 | 9/1980 | (JP) | A61B/6/00 |
| 55-163472 | 12/1980 | (JP) | G01T/1/29 |
| 56-11395 | 2/1981 | (JP) | G21K/4/00 |
| 56-104645 | 8/1981 | (JP) | A61B/6/00 |

(List continued on next page.)

Primary Examiner—Constantine Hannaher
Assistant Examiner—Otilia Gabor
(74) Attorney, Agent, or Firm—Sughrue, Mion, Zinn, Macpeak & Seas, PLLC (57) ABSTRACT

A image recording and reading system is constituted by the combination of a stimulable phosphor sheet formed with, on one side thereof, a first stimulable phosphor layer containing a stimulable phosphor which can store radiation energy and electron beam energy and release the stored radiation energy and the stored electron beam energy in the form of light upon being excited with an electromagnetic wave and formed with, on the other side, a second stimulable phosphor layer containing a stimulable phosphor which can store the energy of visible light and release the stored energy of the visible light in the form of light upon being excited with an electromagnetic wave, and an image reading apparatus including a first stimulating ray source capable of exciting the stimulable phosphor contained in the first stimulable phosphor layer, a second stimulating ray source capable of exciting the stimulable phosphor contained in the second stimulable phosphor layer, a light detector for photoelectrically receiving stimulated emission released from the first stimulable phosphor layer or the second stimulable phosphor layer upon being excited, a first filter located on a front side of a light receiving surface of the light detector for cutting a wavelength of a stimulating ray emitted from the first stimulating ray source and allowing light having a wavelength of the stimulated emission emitted from the first stimulable phosphor layer to transmit therethrough, a second filter located on a front side of the light receiving surface of the light detector for cutting a wavelength of a stimulating ray emitted from the second stimulating ray source and allowing light having a wavelength of the stimulated emission emitted from the second stimulable phosphor layer to transmit therethrough and a filter unit for selectively positioning the first filter or the second filter in front of the light receiving surface of the light detector. According to the thus constituted image recording and reading system, images in a radiation diagnosis system, an autoradiographic system, a chemiluminescence detecting system, an electron microscope detecting system and a radiographic diffraction image detecting system can be read using a single image reading apparatus.

6 Claims, 3 Drawing Sheets

FOREIGN PATENT DOCUMENTS

| | | | |
|---|---|---|---|
| 59-15843 | 1/1984 | (JP) | G01N/23/20 |
| 61-51738 | 3/1986 | (JP) | H01J/37/22 |
| 61-93538 | 5/1986 | (JP) | H01J/37/20 |
| 1-60782 | 12/1989 | (JP) | G01N/33/58 |
| 1-60784 | 12/1989 | (JP) | G01N/33/60 |
| 4-3952 | 1/1992 | (JP) | C12N/15/00 |

* cited by examiner

IMAGE RECORDING AND READING SYSTEM

BACKGROUND OF THE INVENTION

The present invention relates to an image recording and reading system and, particularly, such a system which enables a single image reading apparatus to read images in a radiation diagnosis system, an autoradiographic system, a chemiluminescence detecting system, an electron microscope detecting system and a radiographic diffraction image detecting system.

DESCRIPTION OF THE PRIOR ART

There is known a radiation diagnosis system comprising the steps of employing, as a detecting material for the radiation, a stimulable phosphor which can absorb and store the energy of radiation upon being irradiated therewith and release a stimulated emission whose amount is proportional to that of the received radiation upon being stimulated with an electromagnetic wave having a specific wavelength range, storing and recording the energy of radiation transmitted through an object in the stimulable phosphor contained in a stimulable phosphor layer formed on a stimulable phosphor sheet, scanning the stimulable phosphor layer with an electromagnetic wave to excite the stimulable phosphor, photoelectrically detecting the stimulated emission released from the stimulable phosphor to produce digital image signals, effecting image processing on the obtained digital image signals, and reproducing an image on displaying means such as a CRT or the like or a recording material such as a photographic film (see for example, Japanese Patent Application Laid Open Nos. 55-12429, 55-116340, 55-163472, 56-11395, 56-104645 and the like).

There is also known an autoradiography system comprising the steps of employing a similar stimulable phosphor as a detecting material for the radiation, introducing a radioactively labeled substance into an organism, using the organism or a part of the tissue of the organism as a specimen, placing the specimen and a stimulable phosphor sheet formed with a stimulable phosphor layer together in layers for a certain period of time, storing and recording radiation energy in a stimulable phosphor contained in the stimulable phosphor layer, scanning the stimulable phosphor layer with an electromagnetic wave to excite the stimulable phosphor, photoelectrically detecting the stimulated emission released from the stimulable phosphor to produce digital image signals, effecting image processing on the obtained digital image signals, and reproducing an image on displaying means such as a CRT or the like or a recording material such as a photographic film (see for example, Japanese Patent Publication No. 1-60784, Japanese Patent Publication No. 1-60782, Japanese Patent Publication No. 4-3952 and the like).

There is further known chemiluminescence detecting system comprising the steps of employing, as a detecting material for light, a stimulable phosphor which can absorb and store the energy of light upon being irradiated therewith and release a stimulated emission whose amount is proportional to that of the received light upon being stimulated with an electromagnetic wave having a specific wavelength range, selectively labeling a fixed high molecular substance such as a protein or a nucleic acid sequence with a labeling substance which generates chemiluminescent emission when it contacts a chemiluminescent substance, contacting the high molecular substance selectively labeled with the labeling substance and the chemiluminescent substance, storing and recording the chemiluminescent emission in the wavelength of visible light generated by the contact of the chemiluminescent substance and the labeling substance in the stimulable phosphor contained in a stimulable phosphor layer formed on a stimulable phosphor sheet, scanning the stimulable phosphor layer with an electromagnetic wave to excite the stimulable phosphor, photoelectrically detecting the stimulated emission released from the stimulable phosphor to produce digital image signals, effecting image processing on the obtained digital image signals, and reproducing an image on displaying means such as a CRT or a recording material such as a photographic film (see for example, U.S. Pat. No. 5,028,793, UK Patent Application 2,246,197 A and the like).

There are further known an electron microscope detecting system and a radiographic diffraction image detecting system comprising the steps of employing, as a detecting material for an electron beam or radiation, a stimulable phosphor which can absorb and store the energy of an electron beam or radiation upon being irradiated therewith and release a stimulated emission whose amount is proportional to that of the received electron beam or radiation upon being stimulated with an electromagnetic wave having a specific wavelength range, irradiating a metal or nonmetal specimen with an electron beam and effecting elemental analysis, composition analysis or structural analysis of the specimen by detecting a diffraction image or a transmission image, or irradiating the tissue of an organism with an electron beam and detecting an image of the tissue of the organism, or irradiating a specimen with radiation, detecting a radiographic diffraction image and effecting structural analysis of the specimen (see for example, Japanese Patent Application Laid Open No. 61-51738, Japanese Patent Application Laid Open No. 61-93538, Japanese Patent Application Laid Open No. 59-15843 and the like).

Unlike the system using a photographic film, according to these systems using the stimulable phosphor as a detecting material for an image, development which is chemical processing, becomes unnecessary. Further, it is possible reproduce a desired image by effecting image processing on the obtained image data and effect quantitative analysis using a computer. Use of a stimulable phosphor in these processes is therefore advantageous.

Either of the radiation diagnosis system, the autoradiographic system, the chemiluninescence detecting system, the electron microscope detecting system and the radiographic diffraction image detecting system stores an image in the stimulable phosphor, scans the stimulable phosphor layer with anaelectromagnetic wave to excite the stimulable phosphor, photoelectrically detects the stimulated emission released from the stimulable phosphor and reproduces an image and these systems are often used for similar purposes. Therefore, it is preferable that images in these system can be read by a single image reading apparatus.

However, the wavelength of a stimulating ray which can effectively excite the stimulable phosphor employed in the radiation diagnosis system, the autoradiographic system and the electron microscope detecting system and the radiographic diffraction image detecting system differs from the wavelength of a stimulating ray which can effectively excite the stimulable phosphor employed in the chemiluninescence detecting system. Further, the sensitivity is not satisfactory in the case where a chemiluninescent image is recorded using a stimulable phosphor which can effectively used in the radiation diagnosis system, the autoradiographic system and the electron microscope detecting system and the radiographic diffraction image detecting system, the stimulable phosphor layer is then scanned with an electromagnetic wave to excite the stimulable phosphor and the stimulated emission released from the stimulable phosphor is photoelectrically detected to reproduce an image, while the sensitivity is also not satisfactory in the case where a radiation image, an autoradiographic image, an electron microscope image or a radiographic diffraction image is recorded using a stimulable phosphor which can effectively used in the chemiluninescence detecting system, the stimulable phosphor layer is then scanned with an electromagnetic wave to excite the stimulable phosphor and the stimulated emission released from the stimulable phosphor is photoelectrically detected to reproduce an image. Therefore, it is impossible to read images in these systems by a single image reading apparatus.

SUMMARY OF THE INVENTION

It is therefore an object of the present invention to provide an image recording and reading system which enables a single image reading apparatus to read images in a radiation diagnosis system, an autoradiographic system, a chemiluminescence detecting system, an electron microscope detecting system and a radiographic diffraction image detecting system.

The above and other objects of the present invention can be accomplished by an image recording and reading system comprising the combination of a stimulable phosphor sheet formed with, on one side thereof, a first stimulable phosphor layer containing a stimulable phosphor which can store the energy of radiation, the energy of an electron beam and release the stored energy of radiation and the energy of the electron beam in the form of light upon being excited with an electromagnetic wave and formed with, on the other side, a second stimulable phosphor layer containing a stimulable phosphor which can store the energy of visible light and release the stored energy of the visible light in the form of light upon being excited with an electromagnetic wave, and an image reading apparatus comprising a first stimulating ray source capable of exciting the stimulable phosphor contained in the first stimulable phosphor layer, a second stimulating ray source capable of exciting the stimulable phosphor contained in the second stimulable phosphor layer, a light detector for photoelectrically receiving stimulated emission released from the first stimulable phosphor layer or the second stimulable phosphor layer upon being excited, a first filter located on a front side of a light receiving surface of the light detector for cutting a wavelength of a stimulating ray emitted from the first stimulating ray source and allowing light having a wavelength of the stimulated emission emitted from the first stimulable phosphor layer to transmit therethrough, a second filter located on a front side of the light receiving surface of the light detector for cutting a wavelength of a stimulating ray emitted from the second stimulating ray source and allowing light having a wavelength of the stimulated emission emitted from the second stimulable phosphor layer to transmit therethrough and a filter unit for selectively positioning the first filter or the second filter in front of the light receiving surface of the light detector.

In a preferred aspect of the present invention, the stimulable phosphor contained in the first stimulable phosphor layer is constituted by a BaFX system stimulable phosphor wherein X is any halogen atom and the stimulable phosphor contained in the second stimulable phosphor layer is constituted by an SrS system stimulable phosphor.

In a further preferred aspect of the present invention, the first stimulating ray source is constituted by a laser source for emitting a laser beam having a wavelength in the range of 600 nm to 700 nm and the second stimulating ray source is constituted by a laser source for emitting a laser beam having a wavelength in the range of 780 nm to 1100 nm.

In a further preferred aspect of the present invention, the first stimulating ray source is constituted by a helium-neon laser source for emitting a laser beam having a wavelength of 633 nm or a semiconductor laser source for emitting a laser beam having a wavelength of 635 nm and the second stimulating ray source is constituted by a semiconductor laser source for emitting a laser beam having a wavelength of 980 nm.

In the present invention, the stimulable phosphor usable for the first stimulable phosphor layer may be of any type insofar as it can store radiation energy or electron beam energy and can be stimulated by an electromagnetic wave to release the radiation energy or electron beam energy stored therein in the form of light. More specifically, preferably employed stimulable phosphors include alkaline earth metal fluorohalide phosphors $(Ba_{1-x},M^{2+}{}_x)F\ X{:}yA$ (where $M^{2+}$ is at least one alkaline earth metal selected from the group consisting of Mg, Ca, Sr, Zn and Cd; X is at least one halogen selected from the group consisting of Cl, Br and I, A is at least one element selected from the group consisting of Eu, Tb, Ce, Tm, Dy, Pr, He, Nd, Yb and Er; x is equal to or greater than 0 and equal to or less than 0.6 and y is equal to or greater than 0 and equal to or less than 0.2) disclosed in U.S. Pat. No. 4,239,968, alkaline earth metal fluorohalide phosphors SrFX:Z (where X is at least one halogen selected from the group consisting of Cl, Br and I; and Z is at least one of Eu and Ce) disclosed in Japanese Patent Application Laid Open No. 2-276997, europium activated complex halide phosphors BaFX xNaX':aEu$^{2+}$ (where each of X and X' is at least one halogen selected from the group consisting of Cl, Br and I; x is greater than 0 and equal to or less than 2; and y is greater than 0 and equal to or less than 0.2) disclosed in Japanese Patent Application Laid Open No. 59-56479, cerium activated trivalent metal oxyhalide phosphors MOX:xCe (where M is at least one trivalent metal selected from the group consisting of Pr, Nd, Pm, Sm, Eu, Tb, Dy, Ho, Er, Tm, Yb and Bi; X is at least one halogen selected from the group consisting of Br and I; and x is greater than 0 and less than 0.1) disclosed in Japanese Patent Application Laid Open No. 58-69281, cerium activated rare earth oxyhalide phosphors LnOX:xCe (where Ln is at least one rare earth element selected from the group consisting of Y, La, Gd and Lu; X is at least one halogen selected from the group consisting of Cl, Br, and I; and x is greater than 0 and equal to or less than 0.1) disclosed in U.S. Pat. No. 4,539,137 and europium activated complex halide phosphors $M^{II}FXaM^{I}X'bM^{II}X''{}_2cM^{III}X'''{}_3xA{:}yEu^{2+}$ (where $M^{II}$ is at least one alkaline earth metal selected from the group consisting of Ba, Sr and Ca; $M^{I}$ is at least one alkaline metal selected from the group consisting of Li, Na, K, Rb and Cs; $M^{II}$ is at least one divalent metal selected from the group consisting of Be and Mg; $M^{III}$ is at least one trivalent metal selected from the group consisting of Al, Ga, In and Tl; A is at least one metal oxide; X is at least one halogen selected from the group consisting of Cl, Br and I; each of X', X" and X'" is at least one halogen selected from the group consisting of F, Cl, Br and I; a is equal to or greater than 0 and equal to or less than 2; b is equal to or greater than 0 and equal to or less than 10−2; c is equal to or greater than 0 and equal to or less than $10^{-2}$; a+b+c is equal to or greater than 10−2; x is greater than 0 and equal to or less than 0.5; and y is greater than 0 and equal to or less than 0.2) disclosed in U.S. Pat. No. 4,962,047.

In the present invention, the stimulable phosphor usable for the second stimulable phosphor layer may be of any type insofar as it can store the energy of light in the wavelength band of visible light and can be stimulated by an electromagnetic wave to release in the form of light the energy of light in the wavelength band of visible light stored therein. More specifically, preferably employed stimulable phosphors include at least one selected from the group consisting of metal halophosphates, rare-earth-activated sulfide-host phosphors, aluminate-host phosphors, silicate-host phosphors, fluoride-host phosphors and mixtures of two, three or more of these phosphors. Among them, rare-rare-earth-activated sulfide-host phosphors are more preferable and, particularly, rare-earth-activated alkaline earth metal sulfide-host phosphors disclosed in U.S. Pat. Nos. 5,029,253 and 4,983,834 are most preferable.

The above and other objects and features of the present invention will become apparent from the following description made with reference to the accompanying drawings.

DESCRIPTION OF THE PREFERRED EMBODIMENT

Figure 1:
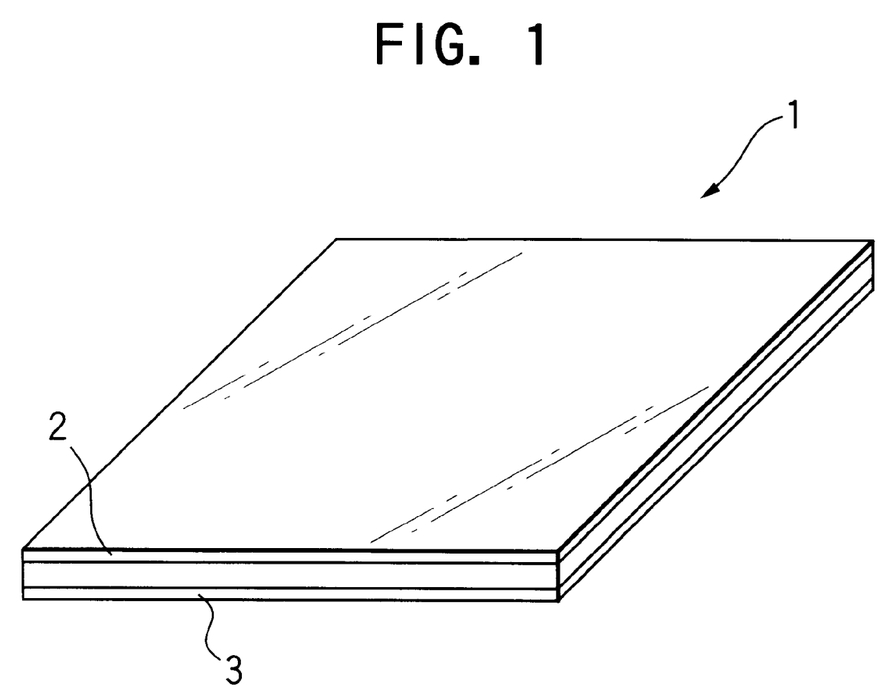
FIG. 1 is a schematic perspective view showing a stimulable phosphor sheet used for an image recording and reading system which is a preferred embodiment of the present invention.

As shown in FIG. 1, a stimulable phosphor sheet 1 is formed with, one side thereof, a first stimulable phosphor layer 2 and formed with, the other side thereof, a second stimulable phosphor layer 3. The first stimulable phosphor layer 2 contains a BaFX system stimulable phosphor wherein X is any halogen atom and the second stimulable phosphor layer 3 contains an SrS system stimulable phosphor.

The BaFX system stimulable phosphor wherein X is any halogen atom can efficiently store radiation energy or electron beam energy and can release the radiation energy or the electron beam energy in the form of light upon being stimulated by an electromagnetic wave. Therefore, it can be used for storing and recording a radiation image of an object, an autoradiographic image, a radiographic diffraction image or an electron microscope image. On the other hand, the SrS system stimulable phosphor contained in the second stimulable phosphor layer 3 can effectively store the energy of visible light and can release the energy of visible light in the form of light upon being stimulated by an electromagnetic wave. Therefore, it can be used for storing and recording a chemiluminescent image.

Figure 2:
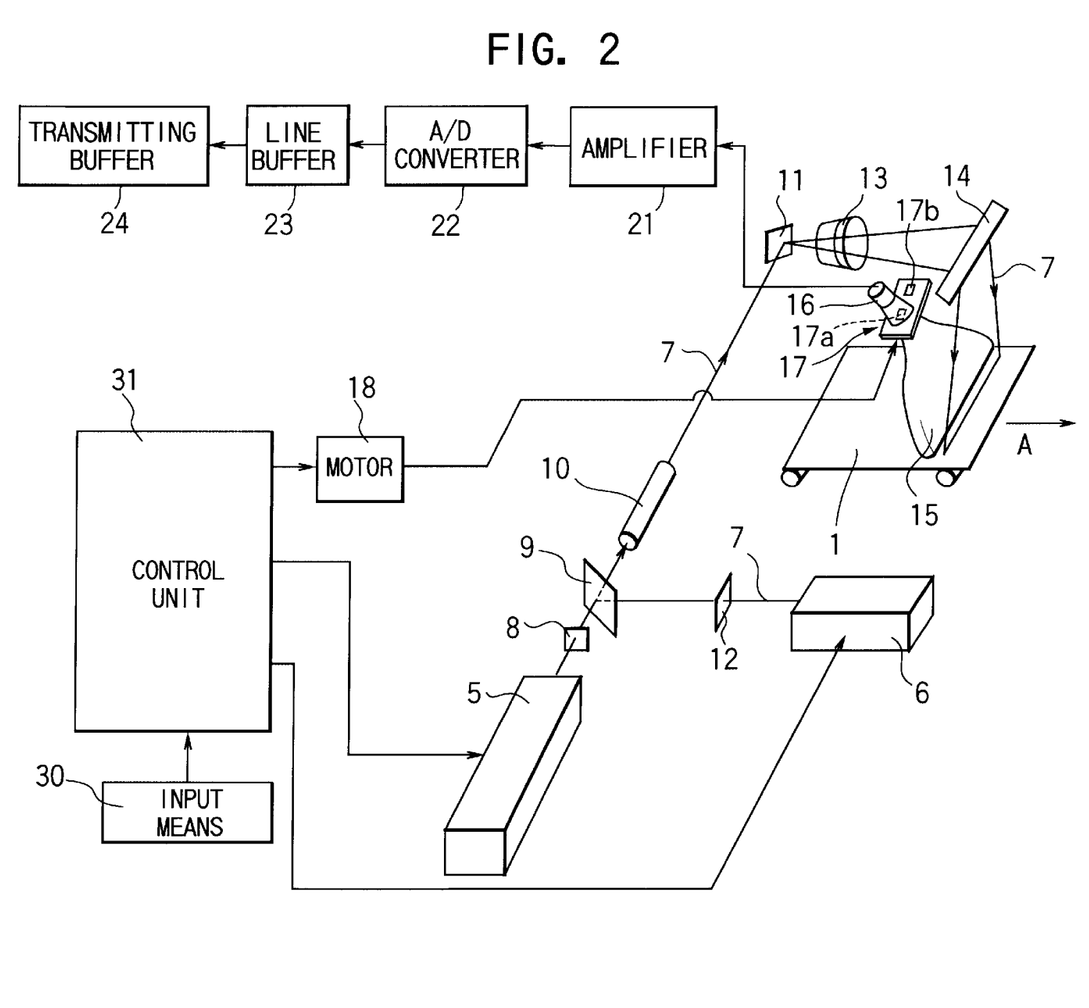
FIG. 2 is a schematic perspective view showing one example of an image recording and reading system which is a preferred embodiment of the present invention.

FIG. 2 is a schematic perspective view showing one example of an image recording and reading system which is a preferred embodiment of the present invention.

As shown in FIG. 2, the stimulable phosphor sheet 1 is set in the image reading apparatus such that the first stimulable phosphor layer 2 faces upward and the first stimulable phosphor layer 2 stores locational information regarding a radioactively labeling substance as radiation energy.

In the illustrated example, locational information regarding a radioactively labeling substance obtained by two-dimensionally distributing protein labeled with a radioactively labeling substance on a TLC plate is recorded as an autoradiographic image in the first stimulable phosphor layer 2.

Locational information as termed here includes a variety of information relating to the location of a radioactively labeling substance, or aggregations thereof, present in the specimen, such as the location, the shape, the concentration, the distribution or combination thereof.

A chemiluminescent image of a gene formed using the Southern blot hybridization method is stored and recorded in the second stimulable phosphor layer 3 formed on the surface of the stimulable phosphor sheet 1 opposite to the first stimulable phosphor layer 2.

The image reading apparatus is provided with a first laser stimulating ray source 5 and a second laser stimulating ray source 6. In this embodiment, the first laser stimulating ray source 5 is constituted by a helium-neon laser source for emitting a laser beam having a wavelength of 633 nm which can efficiently stimulate a BaFX system stimulable phosphor and the second laser stimulating ray source 6 is constituted by a semiconductor laser source for emitting a laser beam having a wavelength of 980 nm which can effectively stimulate an SrS system stimulable phosphor.

A laser beam 7 emitted from the first laser stimulating ray source 5 passes through a filter 8 to cut off light in the wavelength region corresponding to the wavelength region of stimulated emission to be released from the stimulable phosphor contained in the first stimulable phosphor layer 2 in response to stimulation by the laser beam 7. The laser beam 7 transmits through a dichroic mirror 9 and the beam diameter of the laser beam 7 is accurately adjusted by a beam expander 10. The laser beam 7 then enters a beam deflector 11 such as a galvanometer.

On the other hand, a laser beam 7 emitted from the second laser stimulating ray source 5 passes through a filter 12 to cut off light in the wavelength region corresponding to the wavelength region of stimulated emission to be released from the stimulable phosphor contained in the second stimulable phosphor layer 3 in response to stimulation by the laser beam 7. The laser beam 7 is reflected by the dichroic mirror 9 and the beam diameter of the laser beam 7 is accurately adjusted by a beam expander 10. The laser beam 7 then enters a beam deflector 11 such as a galvanometer.

The laser beam 7 deflected by the beam deflector 11 passes through an fθ lens 13 and is reflected by a plane reflecting mirror 14, thereby impinging upon the stimulable phosphor sheet 1. The fθ lens 13 ensures that the stimulable phosphor sheet 1 is always scanned with the laser beam 7 at a uniform speed.

The stimulable phosphor sheet 1 is conveyed in the direction along the arrow A in FIG. 2 in synchronism with the above mentioned scanning with the laser beam 7 so that the whole surface of the stimulable phosphor sheet 1 is scanned by the laser beam 7.

When irradiated with the laser beam 7, the stimulable phosphor contained in the first stimulable phosphor layer 2 or the second stimulable phosphor layer 3 releases stimulated emission in an amount proportional to the radiation energy or the light energy stored therein and the stimulated emission enters a light guide 15.

The light receiving end of the light guide 15 has a linear shape and is positioned in the vicinity of the stimulable phosphor sheet 1 so as to face the scanning line on the stimulable phosphor sheet 1. The exit end of the light guide 15 is in the form of a ring and is connected to the light receiving of a light detector 16 such as a photomultiplier for electrically detecting light. The light guide 15 is made by processing non-fluorescent glass and so constituted that the emission introduced from the light receiving end is transmitted to the exit end under repeated total reflection within the light guide 15 and received by the light receiving surface of the light detector 16 via the exit end.

Therefore, the stimulated emission produced by the stimulable phosphor sheet 1 upon being irradiated with the laser beam 7 enters into the light guide 15 and is received by the light detector 16 under repeated total reflection within the light guide 15.

Figure 3:
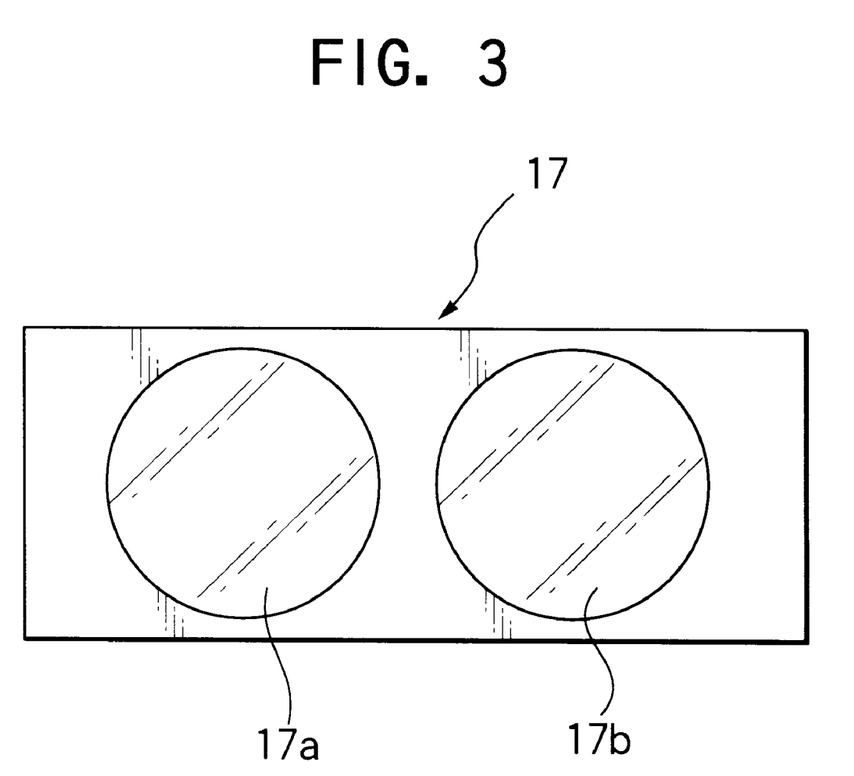
FIG. 3 is a schematic front view showing a filter member.

A filter member 17 made of a rectangular plate member is provided in front of the light receiving surface of the light detector 16 so as to be laterally movable. The filter member 17 includes a first filter 17a for transmitting only light in the wavelength region of stimulated emission released from the stimulable phosphor contained in the first stimulable phosphor layer 2 and cutting off light in the wavelength region of the laser beam 7 and a second filter 17b for transmitting only light in the wavelength region of stimulated emission released from the stimulable phosphor contained in the second stimulable phosphor layer 3 and cutting off light in the wavelength region of the laser beam 7. The filter member 17 is movable by a motor 18. In accordance with instruction signals from the user, the motor 18 moves the filter member 17 so that the first filter 17a is positioned in front of the light receiving surface of the light detector 16 when the first stimulable phosphor layer 2 is excited by the laser beam 7 emitted from the first laser stimulating ray source 5, while it moves the filter member 17 so that the second filter 17b is positioned in front of the light receiving surface of the light detector 16 when the second stimulable phosphor layer 3 is excited by the laser beam 7 emitted from the second laser stimulating ray source 6. Therefore, the light detector 16 can photoelectrically detect only stimulated emission released from the stimulable phosphor sheet 1.

The stimulated emission photoelectrically detected by the light detector 16 is converted to an electrical signal, amplified by an amplifier 21 having a predetermined amplifying factor so as to produce an electrical signal of a predetermined level and then input to an A/D converter 22. The electrical signal is converted to a digital signal with a scale factor suitable for the signal fluctuation width and input to a line buffer 23. The line buffer 23 temporarily stores image data corresponding to one scanning line. When the image data corresponding to one scanning line have been stored in the line buffer 23 in the above described manner, the line buffer 23 outputs the data to a transmitting buffer 24 whose capacity is greater than that of the line buffer 23 and when the transmitting buffer 24 has stored a predetermined amount of the image data, it outputs the image data to an image analyzing apparatus.

The thus constituted image reading apparatus of the image recording and reading system which is an embodiment of the present invention reads a radiation image stored and recorded in the first stimulable phosphor layer 2 of the stimulable phosphor sheet 1 and a chemiluminescent image stored and recorded in the second stimulable phosphor layer 3 of the stimulable phosphor sheet 1 in the following manner.

When an image stored and recorded in the first stimulable phosphor layer 2 formed on the stimulable phosphor sheet 1 is read, the stimulable phosphor sheet 1 is set such that the first stimulable phosphor layer 2 faces upward and when an image stored and recorded in the second stimulable phosphor layer 3 formed on the stimulable phosphor sheet 1 is read, the stimulable phosphor sheet 1 is set such that the second stimulable phosphor layer 2 faces upward. An instruction signal regarding which stimulable phosphor layer is to be stimulated is input through an input means 30 such as a keyboard to the image reading apparatus. The instruction signal is input to a control unit 31 and when the control unit 31 receives the signal instructing that an image stored and recorded in the first stimulable phosphor layer 2 is to be read, it outputs a drive signal to the motor 18, thereby causing it to move the filter member 17 so that the first filter 17a is positioned in front of the light receiving surface of the light detector 16 and simultaneously actuates the first laser stimulating ray source 5.

In FIG. 2, since the stimulable phosphor sheet 1 is set such that the first stimulable phosphor layer 2 faces upward, the first laser stimulating ray source 5 is first actuated, whereby the surface of the first stimulable phosphor layer 2 of the stimulable phosphor sheet 1 is one-dimensionally scanned with the laser beam 7 emitted from the first laser stimulating ray source 5.

When irradiated with the laser beam 7, the stimulable phosphor contained in the first stimulable phosphor layer 2 of the stimulable phosphor sheet 1 releases stimulated emission whose amount is proportional to that of the stored and recorded radiation energy therein and the stimulated emission enters a light guide 15.

The stimulated emission entered the light guide 15 advances under repeated total reflection in the light guide 15 and impinges from the exit end of the light guide 15 upon the first filter 17a located in front of the light detector 16. As a result, light in the wavelength region of the laser beam 7 is cut off, whereby only light in the wavelength region of the stimulated emission released from the stimulable phosphor contained in the first stimulable phosphor layer 2 passes through the first filter 17a and is photoelectrically detected by the light detector 16.

The stimulated emission photoelectrically detected by the light detector 16 is converted to an electrical signal, amplified by the amplifier 21 having a predetermined amplifying factor so as to produce an electrical signal of a predetermined level and then input to the A/D converter 22. The electrical signal is converted to a digital signal with a scale factor suitable for the signal fluctuation width and input to the line buffer 23. When the image data corresponding to one scanning line have been stored in the line buffer 23 in the above described manner, the line buffer 23 outputs the data to the transmitting buffer 24 and when the transmitting buffer 24 has stored a predetermined amount of the image data, it outputs the image data to an image analyzing apparatus.

Locational information of radioactively labeling substance stored and recorded in the first stimulable phosphor layer 2 of the stimulable phosphor sheet 1 is read and image data are produced in the above described manner.

On the other hand, when an image stored and recorded in the second stimulable phosphor layer 3 is read, the user sets the stimulable phosphor sheet 1 in the image reading apparatus such that the second stimulable phosphor layer 3 faces upward. When the user inputs through the input means 30 to the control unit 31 a signal instructing that an image stored and recorded in the second stimulable phosphor layer 3 is to be read, the control unit 31 outputs a drive signal to the motor 18, thereby causing it to move the filter member 17 so that the second filter 17b is positioned in front of the light receiving surface of the light detector 16 and simultaneously actuates the second laser stimulating ray source 6.

As a result, the surface of the second stimulable phosphor layer 3 of the stimulable phosphor sheet 1 is one-dimensionally scanned with the laser beam 7 emitted from the second laser stimulating ray source 6.

When irradiated with the laser beam 7, the stimulable phosphor contained in the second stimulable phosphor layer 3 of the stimulable phosphor sheet 1 releases stimulated emission whose amount is proportional to that of the stored and recorded radiation energy therein and the stimulated emission enters a light guide 15.

The stimulated emission entered the light guide 15 advances under repeated total reflection in the light guide 15 and impinges from the exit end of the light guide 15 upon the second filter 17b located in front of the light detector 16. As a result, light in the wavelength region of the laser beam 7 is cut off, whereby only light in the wavelength region of the stimulated emission released from the stimulable phosphor contained in the second stimulable phosphor layer 3 passes through the second filter 17b and is photoelectrically detected by the light detector 16.

The stimulated emission photoelectrically detected by the light detector 16 is converted to an electrical signal, amplified by the amplifier 21 having a predetermined amplifying factor so as to produce an electrical signal of a predetermined level and then input to the A/D converter 22. The electrical signal is converted to a digital signal with a scale factor suitable for the signal fluctuation width and input to the line buffer 23. When the image data corresponding to one scanning line have been stored in the line buffer 23 in the above described manner, the line buffer 23 outputs the data to the transmitting buffer 24 and when the transmitting buffer 24 has stored a predetermined amount of the image data, it outputs the image data to an image analyzing apparatus.

A chemiluminescent image stored and stored and recorded in the second stimulable phosphor layer 3 of the stimulable phosphor sheet 1 is read and image data are produced in the above described manner.

According to the above described embodiment, the stimulable phosphor sheet 1 is formed with, one side thereof, the first stimulable phosphor layer 2 including a BaFX system stimulable phosphor which can efficiently store radiation energy or electron beam energy and can release the radiation energy or the electron beam energy in the form of light upon being stimulated by an electromagnetic wave and formed with, the other side thereof, a second stimulable phosphor layer 3 including an SrS system stimulable phosphor which can efficiently store the energy of visible light and can release the energy of the visible light in the form of light upon being stimulated by an electromagnetic wave. Further, the image reading apparatus is provided with the first laser stimulating ray source 5 constituted by the helium-neon laser source for emitting a laser beam having a wavelength of 633 nm which can efficiently stimulate the BaFX system stimulable phosphor and the second laser stimulating ray source 6 constituted by the semiconductor laser source for emitting a laser beam having a wavelength of 980 nm which can efficiently stimulate the SrS system stimulable phosphor. Moreover, the filter member 17 made of a rectangular plate member is provided in front of the light detector 16 so as to be laterally movable. The filter member 17 includes the first filter 17a for transmitting only light in the wavelength region of stimulated emission released from the stimulable phosphor contained in the first stimulable phosphor layer 2 and cutting off light in the wavelength region of the laser beam 7 and the second filter 17b for transmitting only light in the wavelength region of stimulated emission released from the stimulable phosphor contained in the second stimulable phosphor layer 3 and cutting off light in the wavelength region of the laser beam 7. Therefore, an autoradiographic image can be read by setting the stimulable phosphor sheet 1 in such a manner that the first stimulable phosphor layer 2 faces upward, exciting the stimulable phosphor contained in the first stimulable phosphor layer 2 with a laser beam 7 emitted from the first laser stimulating ray source 5 and photoelectrically detecting the stimulated emission released from the stimulable phosphor by the light detector 16 through the first filter 17a. Further, a chemiluminescent image can be read by setting the stimulable phosphor sheet 1 in such a manner that the second stimulable phosphor layer 3 faces upward, exciting the stimulable phosphor contained in the second stimulable phosphor layer 3 with a laser beam 7 emitted from the second laser stimulating ray source 6 and photoelectrically detecting the stimulated emission released from the stimulable phosphor by the light detector 16 through the second filter 17b. Accordingly, both an autoradiographic image and a chemiluminescent image can be read by a single image reading apparatus. Further, since the BaFX system stimulable phosphor can efficiently store radiation energy or electron beam energy and can release the radiation energy or electron beam energy in the form of light upon being stimulated by an electromagnetic wave, if a radiation image of an object, a radiographic diffraction image or an electron microscope image is stored and recorded in the first stimulable phosphor layer 2, the radiation image of an object, the radiographic diffraction image or the electron microscope image can also be read by exciting the stimulable phosphor contained in the first stimulable phosphor layer 2 using the first laser stimulating ray source 5.

The present invention has thus been shown and described with reference to specific embodiments. However, it should be noted that the present invention is in no way limited to the details of the described arrangements but changes and modifications may be made without departing from the scope of the appended claims.

For example, in the above described embodiment, the explanation is made as to two-dimensionally distributing protein labeled with a radioactively labeling substance on a TLC plate and storing locational information regarding the radioactively labeling substance in the first stimulable phosphor layer 2 as an autoradiographic image, and a chemiluminescent image of a gene produced using the Southern blot hybridization method in the second stimulable phosphor layer 3, and reading them. However, the present invention is not limited to the reading of such images and can also be applied for reading an autoradiographic image obtained by slicing a test mouse when a predetermined time period has passed after a drag labeled with a radioactively labeling substance was introduced for studying the metabolism, absorption, excretion path and state of a substance, an autoradiographic image of a gene electrophoresed by Southern blot hybridization method, an autoradiographic image of a protein produced by polyacrylamide gel electrophoresis for the separation or identification of a protein or estimation of the molecular weight or properties of a protein or the like. Moreover, an electron beam transmission image, an electron beam diffraction image of metal or nonmetal, an electron beam image of tissue of an organism and a radiographic diffraction image of a metal or nonmetal or the like may be stored and recorded in the first stimulable phosphor layer 2. Further, a chemiluminescent image of a protein produced by thin layer chromatography, a chemiluminescent image of a protein produced by polyacrylamide gel electrophoresis electrophoresis for the separation or identification of a protein or estimation of the molecular weight or properties of a protein or the like may be stored and recorded in the second stimulable phosphor layer 3.

Further, in the above described embodiment, the first stimulable phosphor layer 2 contains a BaFX system stimulable phosphor and the second stimulable phosphor layer 3 contains an SrS system stimulable phosphor. However, a stimulable phosphor contained in the first stimulable phosphor layer 2 is not limited to a BaFX system stimulable phosphor but may be of any type insofar as it can store radiation energy or electron beam energy and can be stimulated by an electromagnetic wave to release the radiation energy or the electron beam energy stored therein in the form of light. A stimulable phosphor contained in the second stimulable phosphor layer 3 is not limited to an SrS system stimulable phosphor but may be of any type insofar as it can store the energy of light in the wavelength of visible light and can be stimulated by an electromagnetic wave to release the energy of light in the wavelength of visible light stored therein in the form of light.

Furthermore, in the above described embodiment, a helium-neon laser beam source for emitting a laser beam having a wavelength of 633 nm is employed as the first laser stimulating ray source 5. However, the first laser stimulating ray source 5 is not limited to a helium-neon laser beam source but may be of any type insofar as it can emit a laser beam which can excite a stimulable phosphor contained in the first stimulable phosphor layer 2. For example, a laser beam source for emitting a laser beam having wavelength of 600 nm to 700 nm may be employed and a semiconductor laser beam source for emitting a laser beam having a wavelength of 635 nm may be preferably used as the first laser stimulating ray source 5. Moreover, in the above described embodiment, a semiconductor laser beam source for emitting a laser beam having a wavelength of 980 nm is employed as the second laser stimulating ray source 6. However, the second laser stimulating ray source 6 is not limited to a semiconductor laser beam source for emitting a laser beam having a wavelength of 980 nm but may be of any type insofar as it can emit a laser beam which can excite a stimulable phosphor contained in the second stimulable phosphor layer 3. For example, a laser beam source for emitting a laser beam having a wavelength of 780 nm to 1100 nm may be employed as the second laser stimulating ray source 6.

Further, in the above described embodiment, although the light guide 15 made by processing a non-fluorescent glass or the like is employed, the light guide 15 is not limited to one nade of a non-fluorescent glass but a light guide made by processing synthetic crystal, a transparent sheet such as an acrylic synthetic resin sheet or the like may be used.

According to the present invention, it is possible to provide an image recording and reading system which enables a single image reading apparatus to read images in a radiation diagnosis system, an autoradiographic system, a chemiluminescence detecting system, an electron microscope detecting system and a radiographic diffraction image detecting system.

What is claimed is:

1. A image recording and reading system comprising the combination of a stimulable phosphor sheet formed with, on one side thereof, a first stimulable phosphor layer containing a stimulable phosphor which can store the energy of radiation, the energy of an electron beam and release the stored energy of radiation and the energy of the electron beam in the form of light upon being excited with an electromagnetic wave and formed with, on the other side, a second stimulable phosphor layer containing a stimulable phosphor which can store the energy of visible light and release the stored energy of the visible light in the form of light upon being excited with an electromagnetic wave, and an image reading apparatus comprising a first stimulating ray source capable of exciting the stimulable phosphor contained in the first stimulable phosphor layer, a second stimulating ray source capable of exciting the stimulable phosphor contained in the second stimulable phosphor layer, a light detector for photoelectrically receiving stimulated emission released from the first stimulable phosphor layer or the second stimulable phosphor layer upon being excited, a first filter located on a front side of a light receiving surface of the light detector for cutting a wavelength of a stimulating ray emitted from the first stimulating ray source and allowing light having a wavelength of the stimulated emission emitted from the first stimulable phosphor layer to transmit therethrough, a second filter located on a front side of the light receiving surface of the light detector for cutting a wavelength of a stimulating ray emitted from the second stimulating ray source and allowing light having a wavelength of the stimulated emission emitted from the second stimulable phosphor layer to transmit therethrough and a filter unit for selectively positioning the first filter or the second filter in front of the light receiving surface of the light detector.

2. A image recording and reading system in accordance with claim 1 wherein the stimulable phosphor contained in the first stimulable phosphor layer is constituted by a BaFX system stimulable phosphor wherein X is any halogen atom and the stimulable phosphor contained in the second stimulable phosphor layer is constituted by an SrS system stimulable phosphor.

3. A image recording and reading system in accordance with claim 2 wherein the first stimulating ray source is constituted by a laser source for emitting a laser beam having a wavelength in the range of 600 nm to 700 nm and the second stimulating ray source is constituted by a laser source for emitting a laser beam having a wavelength in the range of 780 nm to 1100 nm.

4. A image recording and reading system in accordance with claim 3 wherein the first stimulating ray source is constituted by a helium-neon laser source for emitting a laser beam having a wavelength of 633 nm or a semiconductor laser source for emitting a laser beam having a wavelength of 635 nm and the second stimulating ray source is constituted by a semiconductor laser source for emitting a laser beam having a wavelength of 980 nm.

5. A image recording and reading system in accordance with claim 1 wherein the first stimulating ray source is constituted by a laser source for emitting a laser beam having a wavelength in the range of 600 nm to 700 nm and the second stimulating ray source is constituted by a laser source for emitting a laser beam having a wavelength in the range of 780 nm to 1100 nm.

6. A image recording and reading system in accordance with claim 5 wherein the first stimulating ray source is constituted by a helium-neon laser source for emitting a laser beam having a wavelength of 633 nm or a semiconductor laser source for emitting a laser beam having a wavelength of 635 nm and the second stimulating ray source is constituted by a semiconductor laser source for emitting a laser beam having a wavelength of 980 nm.

* * * * *